(12) United States Patent
Eiden

(10) Patent No.: US 7,072,699 B2
(45) Date of Patent: Jul. 4, 2006

(54) SLIDING COVER

(75) Inventor: Niko Eiden, Espoo (FI)

(73) Assignee: Nokia Corporation, Espoo (FI)

( * ) Notice: Subject to any disclaimer, the term of this patent is extended or adjusted under 35 U.S.C. 154(b) by 564 days.

(21) Appl. No.: 10/401,712

(22) Filed: Mar. 28, 2003

(65) Prior Publication Data

US 2003/0165047 A1   Sep. 4, 2003

Related U.S. Application Data

(63) Continuation of application No. PCT/FI00/00851, filed on Oct. 2, 2000.

(51) Int. Cl.
*H04M 1/00* (2006.01)
(52) U.S. Cl. .............. 455/575.8; 455/575.1; 455/575.4; 455/90.3; 455/347; 455/348; 455/349; 379/433.01; 379/433.11; 379/433.12; 379/437; 361/616; 361/727
(58) Field of Classification Search ........... 455/575.1, 455/575.4, 575.8, 90.1–90.3, 347–349; 379/433.01, 379/433.11–433.13, 437, 440, 451–452; 361/724–727, 616, 618, 681, 683; 708/100
See application file for complete search history.

(56) References Cited

U.S. PATENT DOCUMENTS

| | | | | |
|---|---|---|---|---|
| 4,408,346 A | | 10/1983 | Bauer | .......................... 455/175 |
| 5,002,184 A | * | 3/1991 | Lloyd | .......................... 206/305 |
| 5,933,772 A | * | 8/1999 | Wolff | .......................... 455/351 |
| 6,003,052 A | * | 12/1999 | Yamagata | .................... 708/100 |
| 6,009,338 A | | 12/1999 | Iwata et al. | .................. 455/575 |
| 6,065,076 A | * | 5/2000 | Sorenson | ..................... 710/72 |
| 6,201,868 B1 | * | 3/2001 | Murphy et al. | ......... 379/433.01 |
| 6,388,660 B1 | * | 5/2002 | Manser et al. | .............. 345/173 |
| 6,397,078 B1 | * | 5/2002 | Kim | ........................ 455/556.2 |
| 6,573,886 B1 | * | 6/2003 | Lehtinen et al. | ............ 345/173 |
| 6,909,906 B1 | * | 6/2005 | Miyashita | ................ 455/550.1 |
| 6,961,593 B1 | * | 11/2005 | Lonka et al. | ................ 455/573 |

FOREIGN PATENT DOCUMENTS

| | | |
|---|---|---|
| EP | 0124957 A2 | 11/1984 |
| GB | 2337393 | 11/1999 |
| WO | WO 97/03511 | 1/1997 |

* cited by examiner

*Primary Examiner*—Quochien B. Vuong
*Assistant Examiner*—Tuan Tran
(74) *Attorney, Agent, or Firm*—Perman & Green, LLP.

(57) ABSTRACT

An electronic device with a body having a first side, a second side a distance from the first side, and a third side between the first and second side. Portions define a space extending from the first side to the second side across the third side. A sliding cover can be fitted in the space. A first housing part is detachably attachable to the electronic device and can cover at least part of the space when the housing part is attached to the electronic device. The first housing part can restrain the sliding cover from escaping the space when attached to the electronic device. The electronic device can allow, when the first housing part is detached from the electronic device, entry and removal of the sliding cover to and from the space. A cover system detachably attaches a sliding cover to an electronic device.

9 Claims, 4 Drawing Sheets

SLIDING COVER

This application is a continuation of international application number PCT/FI00/00851 filed Oct. 2, 2000, status pending.

FIELD

This invention relates to covers of devices. In particular, but not restricted to, the invention relates to sliding covers of mobile communications devices.

BRIEF DESCRIPTION OF RELATED DEVELOPMENTS

Various devices have been constructed with different flaps, sliding covers and clamp-shell type covers in order to protect or cover some elements contained by the device. For example, some mobile phones have a flap for protecting the keyboard when the keyboard is not needed. For accessing the keyboard, the flap is turned away. In sliding cover constructions, respectively a sliding cover protects the keyboard, when the keyboard is not used, and reveals the keyboard by sliding away when the keyboard is needed. The Nokia® 7110 GSM telephone is an example of the latter concept. There, the sliding cover also comprises a microphone that is brought closer to the mouth of a user when the sliding cover is extended thus improving the convenience of telephone conversations. However, it the telephone falls, the sliding cover may meet an excessive force detaching it from the telephone or, in the worst case, breaking it. Another drawback of the sliding cover that extends across an end of the telephone is that the telephone appears less rigid when the sliding cover is fully extended. Furthermore, it may be troublesome to clean the space between the sliding cover and the mobile telephone should any dirt enter therein.

U.S. Pat. No. 6,003,052 introduces in its FIG. 1B a solution that avoids these problems, but reserves some space at another end of the device thus lengthening the device. There a flexible sliding cover covers the front of the, device and is rolled on a roll located at an end of the device. Another alternative shown in its FIG. 6 reserves some space on the backside of the device for accommodating part of a flexible sliding cover when it is pushed from the front into the space on the backside. The solution is rather convenient for many uses, but it is yet susceptible to dirt that could enter the interior of the device as conveyed by the sliding cover. When dirt accumulates on the backside space, the movement of the sliding cover becomes obstructed by the dirt. The construction of the sliding cover arrangement further comprises a helical spring and sensors attached to the rear cover of the device. It is therefore apparent that the construction would be somewhat laborious to assemble and serve.

Now a device and cover system has been invented where the aforementioned problems can be solved or at least mitigated.

SUMMARY

According to a first aspect of the invention, an electronic device is provided comprising:
  a body comprising a first side, a second side at a distance from the first side, and a third side between the first and second side;
  portions defining a space extending from the first side to the second side across the third side;
  a sliding cover adapted to be fitted in the space; characterised in that
  the electronic device further comprises a first housing part detachably attachable to the electronic device, adapted to cover at least part of the space when the first housing part is attached to the electronic device;
  the first housing part is adapted to restrain the sliding cover from escaping the space, when attached to the electronic device; and
  the electronic device is adapted to allow, when the first housing part is detached from the electronic device, entry and removal of the sliding cover to and from the space.

Advantageously, a user may detach the first housing part for cleaning, or for customising the device according to his own liking, for example by swapping it with one of another colour.

Advantageously, during use, the sliding cover stays within the device. The user need not change his grip from the device and the device feels rigid and robust regardless whether or not the sliding cover is in the closed or opened configuration.

Advantageously, a battery of the device can be placed on the bottom of the body such that it can be replaced after the first housing part is detached. This enables the user to easily swap the battery.

Preferably, the portions defining the space have facing walls and the facing walls define recessing grooves, and the first housing part has side portions arranged to fit into the grooves for supporting the first housing part when attached to the electronic device. More preferably, the body further comprises the portions defining the space.

Advantageously, the grooves provide a reasonably sound attachment of the first housing part to the electronic device. Furthermore, such attachment is reasonably prone to mechanical damage when the first housing part is connected by a large portion of its sides.

Preferably, the electronic device further comprises a first element protected by the sliding cover when in closed configuration and uncovered by the sliding cover when the sliding cover is in the opened configuration, the first element being selected from a group consisting of the following: a display, a touch screen, a speaker, a microphone, a set of keys comprising at least one key, a pointing device, and any combination of them. Preferably, the set of keys is a keyboard.

Preferably, the electronic device further comprises:
  a plurality of sensitive components; and
  a second housing part covered by the first housing part, covering the sensitive components in order to prevent the user from accidentally damaging the sensitive components while the first housing part is detached.

It is an advantage of the second housing part that the sensitive components remain protected by the second housing part when the first housing part is removed. In this way, the user cannot accidentally damage his device, for example, when cleaning the sliding cover or when replacing it.

In an alternative embodiment, the electronic device further comprises a snap-on attaching means for snap-on attaching the first housing part to the electronic device.

The snap-on attaching allows fast and intuitive attaching and detaching of the first housing part.

Preferably, the first housing part is a rear cover adapted to be fitted on the backside of the body to form part of the outer surfaces of the electronic device.

Preferably, the electronic device is a device selected from the group consisting of: a mobile communications device and a mobile gaming device.

According to a second aspect of the invention, a cover system is provided for an electronic device comprising:
a body comprising a first side, a second side, and a third side between the first and second side and the body;
portions defining a space extending from the first side to the second side across the third side;
the cover system comprising:
a sliding cover adapted to be fitted in the space; characterised in that the cover system further comprises:
a housing part detachably attachable to the electronic device, adapted to cover at least part of the space when the housing part is attached to the electronic device;
the housing part is adapted to restrain the sliding cover from escaping the space, when attached to the electronic device; and
the cover system is adapted to allow, when the housing part is detached from the electronic device, entry and removal of the sliding cover to and from the space.

The cover system can be easily replaced in place of a broken cover system by a user. Thanks to the easy attaching and detaching of the cover system, the user can be expected to clean the sliding cover. This further reduces scratching of any component, for example a display, against which the sliding cover moves.

Preferably, the cover system further comprises a snap-on attaching means for snap-on attaching the rear cover to its place.

Advantageously, the snap-on attachment provides the user with a quick, intuitive and easy manner for exchanging the covers, including the sliding cover, and for cleaning the sliding cover.

BRIEF DESCRIPTION OF THE DRAWINGS

The invention will now be described, by way of example only, with reference to the accompanying drawings, in which.

DETAILED DESCRIPTION OF THE PREFERRED EMBODIMENTS

Figure 1:
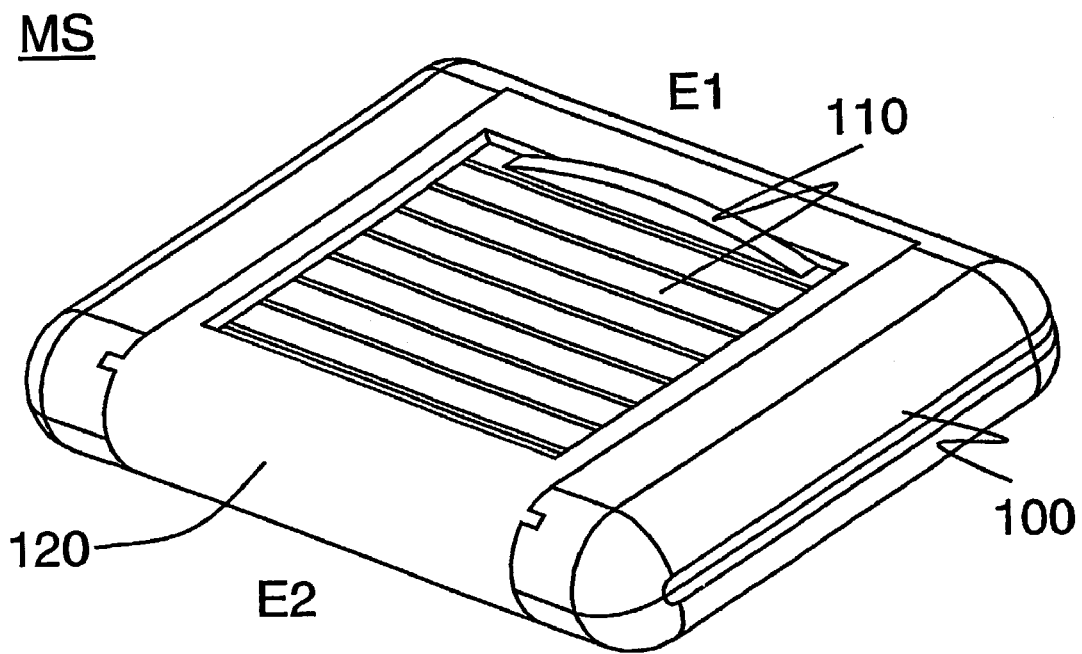
FIG. 1 shows, in a closed configuration, a mobile communications device according to a first embodiment of the invention.

FIG. 1 shows, in a closed configuration, a mobile communications device MS according to a first embodiment of the invention. The figure shows parts of the mobile communications device MS essential to describe for understanding of the invention: a body 100, a sliding cover 110 and a rear cover 120. The body 100 has a relatively planar front plane of which a major part is covered by the sliding cover 110. The sliding cover 110 is surrounded and held in place by the rear cover 120, as is described in more detail below, with reference to FIGS. 3, 4a and 4b.

The mobile communications device MS shown in FIG. 1 is basically rectangular article with rounded edges and corners. It has a large, planar front and bottom surface (latter not shown) and rounded sides. The sides i.e. ends of the mobile communications device have following references: Front side S1 (FIGS. 4a, 4b), back side S2 (FIGS. 4a, 4b), a first end E1 and a second end E2 opposite to the first end E1. The thickness of the mobile communications device MS is small compared to the width and length of the front and bottom surface. In a preferred embodiment, the thickness is in the range of 1 to 5 centimetres and the other dimensions are in the range of 5 to 30 centimetres. In alternative embodiments other shapes and sizes can be used: for example, the front surface may be oval.

Figure 2:
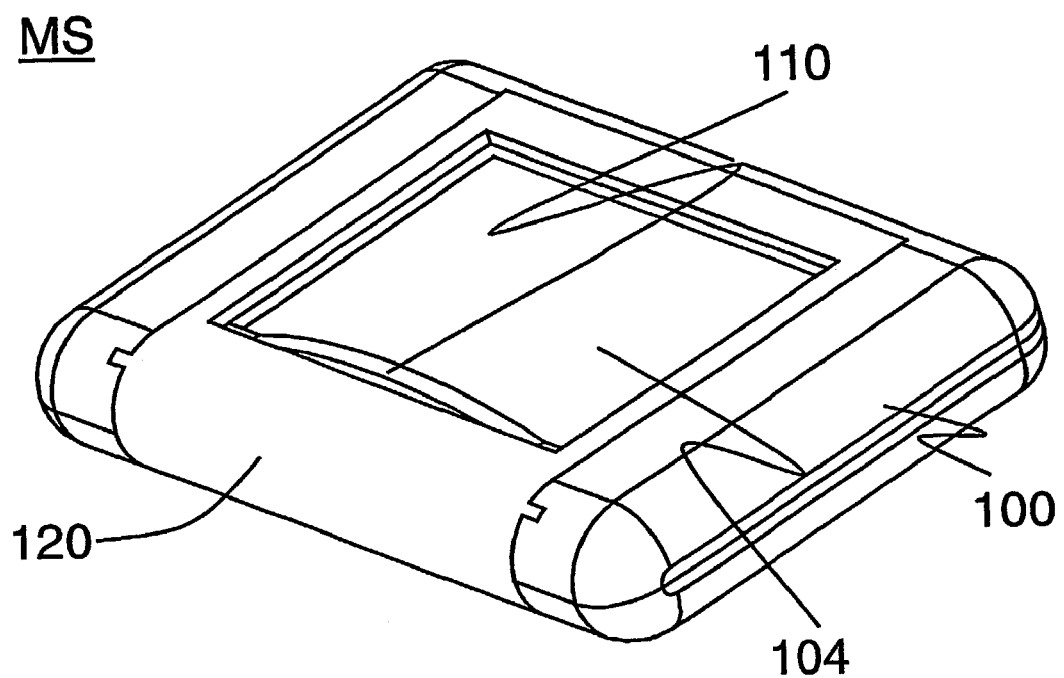
FIG. 2 shows, in an opened configuration, the mobile communications device of FIG. 1.

FIG. 2 shows, in an opened configuration, the mobile communications device MS of FIG. 1. Here, the sliding cover 110 has been slid away revealing a display 104. The purpose of the sliding cover 110 is to protect any fragile or wearing components during storing and transportation, including displays, keyboards or keypads, pointing devices such as mouse pads or embedded pointing sticks. When a user desires to use the mobile communications device MS, he only needs to slide the sliding cover 110 to its opened configuration in order to reveal the display 104. The sliding cover 110 flexes inside the mobile communications device MS, between the backside of the body 100 and the rear cover 120 (better described with reference with FIG. 3). Therefore, the user can maintain his grip when he moves the sliding cover 110 either to an opened or closed configuration. The outer surfaces of the mobile communications device MS are also rather rigid thus providing the user with a feeling of a sound construction, as there are no tolerances of moving parts to be experienced.

Figure 3:
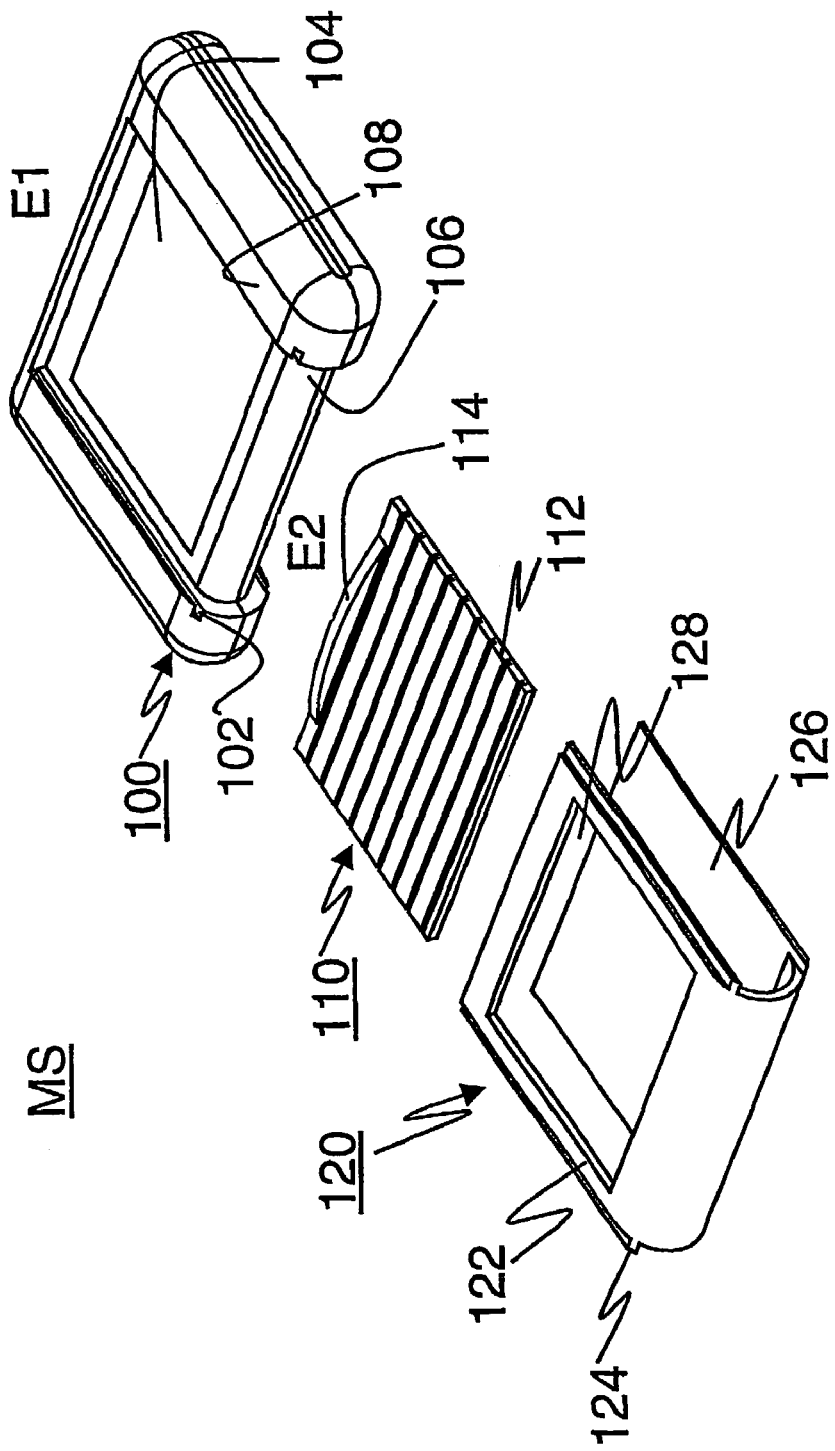
FIG. 3 is a detailed diagram of the mobile communications device of FIGS. 1 and 2.

FIG. 3 is a detailed diagram of the mobile communications device MS of FIGS. 1 and 2. As was described above, the mobile communications device MS comprises three major parts, and now they are described in more detail. The body 100 is, in this embodiment, rather square and elongated rectangular shape when seen from top and side, respectively. As already mentioned, to facilitate describing the construction, one end of the device (seen from top of the device) is referred to as a first end E1 and the opposite end is referred to as a second end E2. The body 100 comprises a first groove 106 that starts close to the first end E1, extends across the top surface of the body, across the second end E2 turning to the backside of the body, and continues there symmetrically across most of the back surfaces (not completely shown). The first groove 106 is dimensioned to receive the sliding cover 110 and the rear cover 120 on top of the sliding cover to sandwich the sliding cover between the rear cover 120 and the body 100.

Figure 4A:
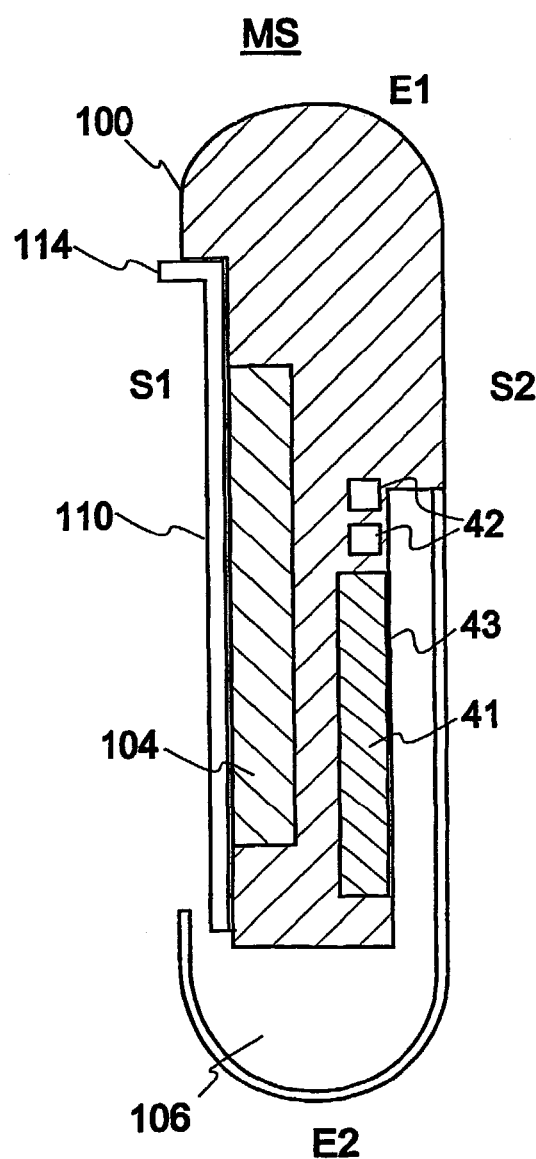
FIG. 4a is a section view of the mobile communications device of FIGS. 1 to 3, seen from a side, in a closed configuration.
Figure 4B:
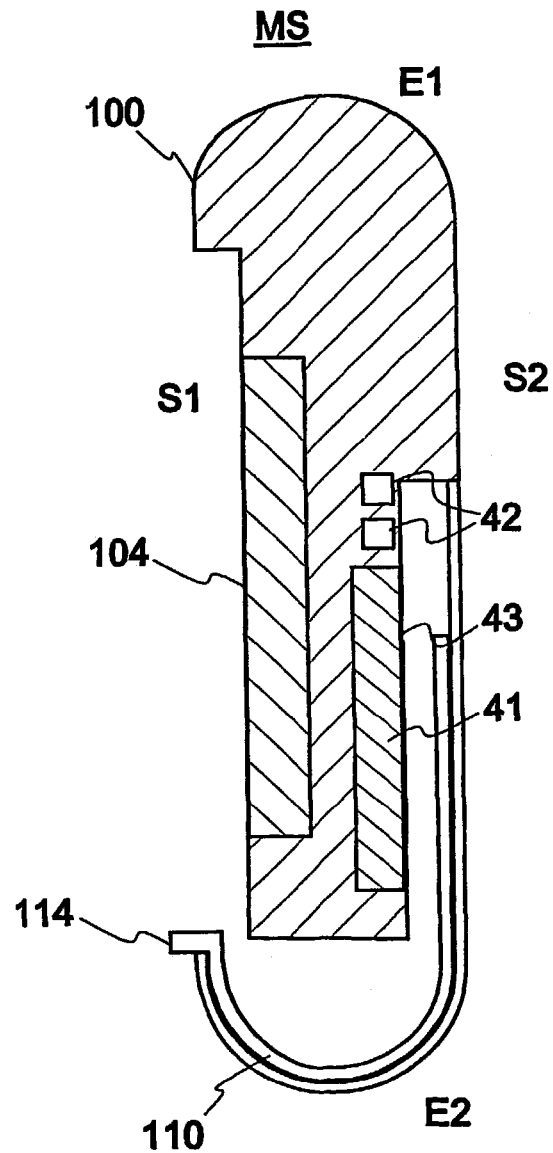
FIG. 4b is a section view of the mobile communications device of FIGS. 1 to 4, seen from a side, in an opened configuration.

The first groove 106 is defined by the body 100: the body 100 has a recess, or the side portions 108 of the body 100 protrude forming the recess in the middle portion of the body 100. The protruding side portions have side walls and end walls on either side (front and back) of the body 100 and a bottom surface, which all together define the recess. The first groove 106 is also shown in FIGS. 4a and 4b, as sectioned, seen from a side of the mobile communications device MS.

Further referring to FIG. 3, the side walls of the first groove 106, on both the front and backside of the body 100, have each a second groove 102 basically parallel to the bottom of the first groove 106. The two second grooves 102 on each side of the body 100 define a plane between themselves such that between the plane and the bottom of the first groove 106 a space remains for the sliding cover 110 to move loosely. The second grooves 102 are just about 1 or 2 mm deep for sufficiently holding in place the rear cover 120 as will be explained later.

In an assembled mobile communications device MS, the sliding cover 110 is entered into the first groove 106, against the bottom of the groove. The assembling of the mobile communications device MS is explained later. The sliding cover 110 is long enough to cover a component to be protected (the display 104 in this case) but far shorter than the first groove (that extends on the backside of the body 100). The sliding cover 110 is made of an elastic polymer or rubber and comprises a number of lamellas 112 connected to each other by thinner sections. Additionally, the sliding cover 110 has a protruding part 114, which the user can grip for sliding the cover between the opened and closed configurations.

In an alternative embodiment, the lamellas 112 comprise another material(s), such as metal or ceramic material. In yet another alternative embodiment, the sliding cover 110 is of flexible material such that it can flex without necessarily having any thinner sections (as in a lamella embodiment). Such flexible materials include metals such as steel, rubber, and flexible polymers.

The rear cover 120 is fitted to cover the first groove 106 on the backside of the body 100. In the preferred embodiment it also frames the sliding cover 110 on the front side of the body 100. For the invention to work and be used it suffices if the rear cover 120 just covers the portion of the first groove 106 that extends across the second end E2 of the body 100 and to some extent across the backside of the body 100. The first groove should have sufficient free length on the backside in order to allow the sliding cover 110 to be moved to the opened configuration. In the preferred embodiment, the rear cover 120 is U-shaped (side view) so that it settles on the back and front sides of the body 100 when attached to the body 100. The front side of the rear cover 120 (seen from top of an assembled device) has a frame 122 defining an open window 128 inside the frame 122. Respectively, the backside of the rear cover 120 has a continues, planar sheet 126 for protecting the sliding cover 110 when the sliding cover is slid away from the top of the display 104, partly to the backside of the body 100. Both the front and backside of the rear cover 120 have thin rims 124 adapted to fit into the second grooves 102. The rims are in the preferred embodiment continuous, but alternatively they may be replaced by short studs or two or more rim sections.

In an alternative embodiment, the first groove 106 ends beyond the second end E2 on the backside of the body 100 to the middle portion of the backside. Hence, the first groove 106 is just long enough to receive a sufficient length of the sliding cover 110 for revealing required amount of the component(s) to protected by the sliding cover 110.

In yet another alternative embodiments, the rear cover 120 is locked to its place by any other means known from the art. For example, instead of using the second grooves 102, the first groove 106 may slope so that at the level of outer surface, the first groove is more narrow than at the bottom of the first groove. Then the rear cover 120 cannot accidentally slip away outwards from the body (it can be slid away but not easily lifted then). In yet another alternative, the rear cover 120 is equipped with latches so that it is attached by pressing it in place against the body and released by pulling to the opposite direction.

The assembly of the mobile communications device MS, according to the preferred embodiment, is next described, still with reference to FIG. 3.

The mobile communication device MS is assembled from the three main parts, body 100, sliding cover 110 and rear cover 120. The sliding cover 110 is first placed between the planar sheet 126 (backside of the rear cover) and the frame 122, adjacent to the frame. The protruding part 114 of the sliding cover 110 passes through the window 128 defined by the frame 122. The sliding cover 110 is held in place in respect to the rear cover 120, in particular in respect to the frame 122. The rear cover 120 is attached to the body 100. In this preferred embodiment, the rear cover 120 is first aligned to the second grooves 102 so that the edges of the rims 124 meet the mouths of the second grooves 102. The rear cover 120 is then slid further until it has fully entered in the second grooves 102, that is, the rear cover 120 covers entirely the first groove 106. The rear cover 120 joins practically seamless with the body 100 so that it forms a continuous part of the outer surface of the communications device MS, as has been shown in FIGS. 1 and 2.

In another embodiment, the frame 122 is left open at the first end E1 side so that the sliding cover 110 can first be placed on the display 104 and then the rear cover 120 can be slid into its place to frame the sliding cover on three sides.

FIG. 4a is a section view of the mobile communications device MS seen from a side, in a closed configuration. On a front side S1 of the body 100, the sliding cover 110 is slid close the first end E1 to its closed configuration so that the display 104 is covered by the sliding cover 110. The protruding part 114 of the sliding cover is against an end of the first groove 106. On a backside S2 of the body 100, the first groove 106 is empty and ready to receive the sliding cover 110.

FIG. 4a also shows a battery 41, of the mobile communications device, located at the backside of the body 100. The battery is concealed by the rear cover 120 and the sliding cover 110 covers it partially when in the opened configuration, as is also shown in FIG. 4b. The body 100 further comprises a plurality of sensitive components 42 such as microchips, transistors and electronic connectors, which are protected by a rear wall 43 of the body 100.

FIG. 4b shows the mobile communications device MS respectively in an opened configuration. The sliding cover 110 slid by its protruding part 114 to the opened configuration revealing the display 104. The protruding part 114 of the sliding cover 110 is close to the second end E2, and the sliding cover is partially located on the backside S2 of the body 100.

The invention enables construction of such sliding mechanisms, which are mainly covered by the housing of a device but yet which mechanisms are easy to service and replace by an ordinary user. The sliding mechanism, while operating inside the housing of a device, maintains the outer dimensions of the device substantially the same regardless whether the sliding cover is in the opened or closed configuration. By sandwiching the sliding cover between two housings on the rear side, it is possible to protect any sensitive electronic and mechanical parts of the device from the user even when the rear cover is removed. Furthermore, as the sliding cover moves within the device, between the body and the rear cover, the grip of the user does not obstruct free motion of the sliding cover. Even further, as the sliding cover does not extend across any edge of the device, it is well resistant against damage in case the device meets mechanical strain, for example if the device falls from the hands of a user. Finally, the actual device (namely the body and parts within it) can be easily made water or gas resistant.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. For example, an entry to the sliding cover may be provided by arranging a removable cover on either the front side, back side, or an end of the device instead of using a cover that extends from the back side to the front side as has been described in the foregoing. It is sufficient for the "rear cover" to cover an aperture large enough so that the sliding cover can be inserted and removed through that aperture. For another example, a part other than the body, such as the rear cover, may form the portions that define the space within which the sliding cover moves. Thus, the scope of the invention is only restricted by the attached patent claims.

What is claimed is:

1. An electronic device (MS) comprising:
   a body (100) comprising a first side (S1), a second side (S2) at a distance from said first side, and a third side (E2) between said first and second side, said body (100) having portions (108) defining a space (106) extending from said first side (S1) across said third side (E2) to said second side (S2);
   a first element (104) at said first side (S1), said first element being a sensitive fragile or wearing component having a need to be protected during storing and transportation of the electronic device (MS);
   a sliding cover (110) adapted to be fitted in said space (106) and being slidably movable between a closed configuration wherein said cover (110) covers said first element (104) at said first side (S1), and an opened configuration wherein said cover is slid from said first side across said third side (E2) to said second side (S2) to uncover said first element (104), characterized in that
   said portions (108) in said body (100) comprise mutually facing side walls between which said space (106) is defined, said side walls having mutually facing recessing grooves (102) opening at their one end to said third side (E1) of said body (100), and
   that the electronic device (MS) further comprises
      a first housing part (120) adapted to cover at least part of said space (106), when said first housing part is attached to said electronic device (MS), to restrain said sliding cover (110) from escaping said space (106), and to allow, when said first housing part (120) is detached from said electronic device, entry and removal of said sliding cover (110) to and from said space (106), said first housing part (120) having side portions (124) being adapted to be slidably fitted into said recessing grooves (102) in a direction defined by said recessing grooves for detachably attaching said first housing part (120) to said body (100) by a simple movement in said one direction.

2. An electronic device according to claim 1, characterized in that the first element (104) is selected from a group consisting of the following:
   a display, a touch screen, a speaker, a microphone, a set of keys comprising at least one key, a pointing device, and any combination of them.

3. An electronic device according to claim 1, characterized in that the electronic device further comprises:
   a plurality of sensitive components (42); and
   a second housing part (43) covered by the first housing part, covering the sensitive components in order to prevent the user from accidentally damaging the sensitive components while the first housing part (120) is detached.

4. An electronic device according to claim 1, characterized in that the electronic device (MS) further comprises a snap-on attaching means for snap-on attaching the first housing part (120) to the electronic device.

5. An electronic device according to claim 1, characterized in that the first housing part (120) is a rear cover adapted to be fitted on the backside of the body (100) to form part of the outer surfaces of the electronic device (MS).

6. An electronic device according to claim 1, characterized in that the electronic device is a device selected from the group consisting of: a mobile communications device and a mobile gaming device.

7. A cover system for an electronic device, said cover system comprising:
   a body (100) comprising a first side (S1), a second side (S2) at a distance from said first side, and a third side (E2) between said first and second side, said body (10) having portions (108) defining a space (106) extending from said first side (S1) across said third side (E2) to said second side (S2);
   a sliding cover (110) adapted to be fitted in said space (106) and being slidably movable between a closed configuration wherein said cover (110) covers said first side (S1), and an opened configuration wherein said cover is slid from said first side to said second side (S2) across said third side (E2), characterized in that
   said portions (108) in said body (100) comprise mutually facing side walls between which said space (106) is defined, said side walls having facing recessing grooves (102) opening at their one end to said third side (E1) of said body (100), and
   that the cover system further comprises
      a first housing part (120) adapted to cover at least part of said space (106), when said first housing part (120) is attached to said body (100) to restrain said sliding cover (110) from escaping said space (106), and to allow, when said first housing part (120) is detached from said body (100), entry and removal of said sliding cover (110) to and from said space (106), said first housing part (120) having side portions (124) adapted to be slidably fitted into said recessing grooves (102) in a direction defined by said recessing grooves for detachably attaching said first housing part (120) to said body (100) by a simple movement in said one direction.

8. A cover system according to claim 7, characterized in that the cover system comprises means for snap-on attaching for attaching said first housing part (120) to said body (100).

9. A cover system according to claim 7, characterized in that the first housing part (120) is a rear cover adapted to be fitted on the backside of the body (100) to form part of the outer surfaces of the electronic device (MS).

* * * * *